(12) United States Patent
Gringel

(10) Patent No.: US 9,034,127 B2
(45) Date of Patent: May 19, 2015

(54) PROCESSING DEVICE

(75) Inventor: Martin Gringel, Strassberg (DE)

(73) Assignee: Homag Holzbearbeitungssysteme AG, Schopfloch (DE)

( * ) Notice: Subject to any disclaimer, the term of this patent is extended or adjusted under 35 U.S.C. 154(b) by 728 days.

(21) Appl. No.: 12/401,825

(22) Filed: Mar. 11, 2009

(65) Prior Publication Data

US 2009/0229731 A1    Sep. 17, 2009

(30) Foreign Application Priority Data

Mar. 12, 2008    (EP) ...................................... 08004575

(51) Int. Cl.
*B23Q 1/01*    (2006.01)

(52) U.S. Cl.
CPC .............. *B23Q 1/015* (2013.01); *Y10T 156/17* (2015.01); *Y10T 156/10* (2015.01); *B23Q 1/012* (2013.01)

(58) Field of Classification Search
CPC ...... B23Q 1/015; B23Q 1/012; Y01T 156/10; Y01T 156/17
USPC ......... 156/71, 60; 408/234; 409/235; 82/149, 82/32
See application file for complete search history.

(56) References Cited

U.S. PATENT DOCUMENTS

| | | | |
|---|---|---|---|
| 2,805,448 A | 9/1957 | Rubenstein | |
| 2,808,085 A | 10/1957 | Hollien et al. | |
| 3,800,636 A * | 4/1974 | Zagar | ............................ 408/234 |
| 4,264,367 A | 4/1981 | Schutz | |
| 4,264,368 A | 4/1981 | Schutz | |
| 4,382,820 A * | 5/1983 | Inoue | ............................. 106/644 |
| 4,453,694 A | 6/1984 | Andreasson | |
| 4,468,160 A | 8/1984 | Campbell, Jr. | |
| 4,626,299 A * | 12/1986 | Knight et al. | .................... 156/71 |
| 4,726,103 A * | 2/1988 | Knight et al. | ................. 29/281.5 |
| 4,907,478 A * | 3/1990 | Brown et al. | ................... 82/149 |
| 5,078,556 A | 1/1992 | Schrod et al. | |
| 5,183,374 A | 2/1993 | Line | |
| 5,439,293 A * | 8/1995 | Mizuno et al. | ..................... 384/9 |
| 5,852,905 A * | 12/1998 | Collina et al. | ............... 52/223.8 |

(Continued)

FOREIGN PATENT DOCUMENTS

| | | |
|---|---|---|
| AT | 355976 B | 8/1979 |
| AT | 373571 B | 2/1984 |
| CH | 584169 A5 | 3/1977 |

(Continued)

OTHER PUBLICATIONS

Karim, et al, Proceedings of the 33rd International MATADOR Conference, "Design Evaluation of Machine Tool Components Using Cementitious Composites", 2000, pp. 495-500.*

(Continued)

*Primary Examiner* — Jeff Aftergut
(74) *Attorney, Agent, or Firm* — Harness, Dickey & Pierce, PLC

(57) ABSTRACT

The invention concerns a processing device for processing workpieces that are preferably made at least partially of wood, wooden materials, plastics or the like, comprising a machine bed and at least one processing unit joined to the machine bed, wherein the machine bed comprises a base body that is made at least in sections of a curable compound. The processing device of the invention is characterized in that the base body and/or at least a part of the processing unit is made at least in sections of cementitious concrete, in particular fiber concrete.

15 Claims, 3 Drawing Sheets

(56) References Cited

U.S. PATENT DOCUMENTS

Figure 1:
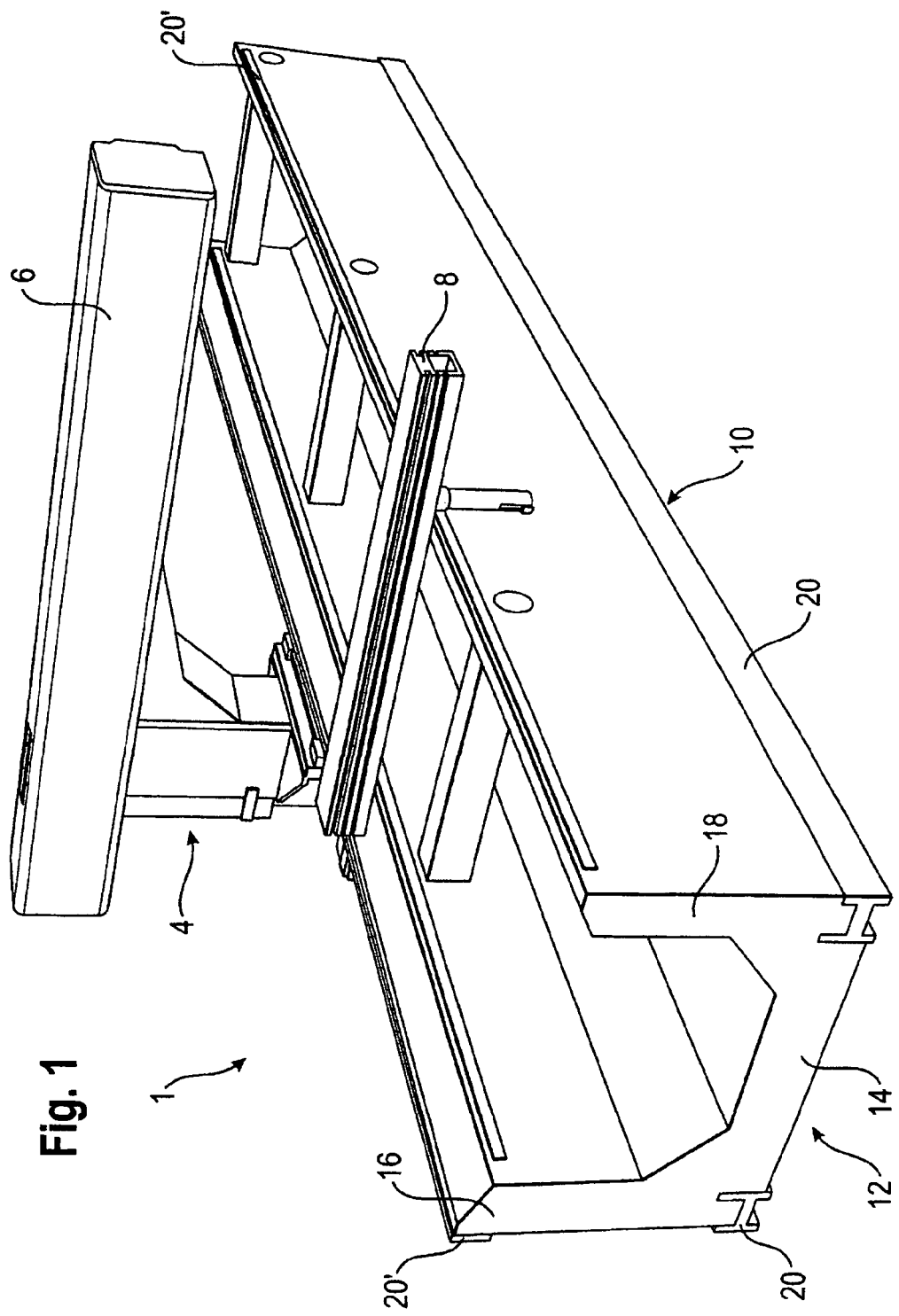

| | | |
|---|---|---|
| 6,519,823 B1 | 2/2003 | Sugata et al. |
| 2010/0260570 A1 | 10/2010 | Bogl |

FOREIGN PATENT DOCUMENTS

| | | |
|---|---|---|
| CH | 634243 A5 | 1/1983 |
| DE | 2256029 A1 | 5/1974 |
| DE | 2521036 A1 | 11/1976 |
| DE | 2924591 A1 | 1/1981 |
| DE | 3415197 A1 | 10/1985 |
| DE | 8700379 U1 | 4/1987 |
| DE | 3626929 A1 | 2/1988 |
| DE | 3734895 A1 | 6/1988 |
| DE | 29801236 U1 | 3/1998 |
| DE | 19745233 A1 | 4/1998 |
| DE | 19752243 A1 | 7/1999 |
| DE | 10023636 C1 | 12/2001 |
| DE | 102004006757 A1 | 9/2005 |
| DE | 102005025468 A1 | 12/2006 |
| DE | 102005052817 B3 | 6/2007 |
| EP | 0194173 A | 9/1986 |
| EP | 0253930 A | 1/1988 |
| EP | 0253930 A1 * | 1/1988 |
| EP | 0420735 A1 | 4/1991 |
| EP | 0590948 A1 | 4/1994 |
| EP | 0627307 A1 | 12/1994 |
| EP | 1207006 A1 | 5/2002 |
| FR | 1296929 A | 6/1962 |
| GB | 1556941 A | 12/1979 |
| GB | 1556941 A * | 12/1979 |
| GB | 2071635 A | 9/1981 |
| GB | 2284250 A | 5/1995 |
| JP | 57194845 A | 11/1982 |
| JP | 2001-212817 A * | 8/2001 |
| WO | 0045990 | 8/2000 |
| WO | 2007039355 A1 | 4/2007 |
| WO | 2009037112 A2 | 3/2009 |

OTHER PUBLICATIONS

Priority European Application Search Report dated Aug. 8, 2008.
European Search Report dated Feb. 12, 2010.
European Search Report dated Jul. 3, 2009.
Document E1—Confirmation of sale No. FV0009027 dated Dec. 22, 1999 relating to the sale of the wood working machine ROVER 346 having the registration No. 93496 to Dall'Agnese S.p. A.
Document E2—Consignment note relating to the shipping of the wood working machine ROVER 346 having the registration No. 93496 to Dall'Agnese S.p.A.
Document E3—Order confirmation relating to the wood working machine ROVER 346 having the registration No. 93496 for Dall'Agnese S.p.A.
Document E4—Internal order relating to the wood working machine ROVER 346 having the registration No. 93496 sold to Dall'Agnese S.p.A.
Document E5—Spare parts catalogue dated Jun. 1999 supplied by Biesse to the buyers of the wood working machines ROVER 346.
Opposition Transcript re: Opposition Against European Patent EP-B1-2100693 in the name of Weeke Bohrsysteme GmbH; Opponent: BIESSE S.p.A.; Represented by: Stefano Manconi et al. c/o Studio Torta; dated Jun. 14, 2012; (9 pages).
Von Dipl.-Ing. H. Grab et al., WB-Lagebericht: Beton im Werkzeugmaschinenbau; Werkstatt and Betrieb 109 (1976) 4; (pp. 195-202); with English Translation (pp. 1-15).

* cited by examiner

PROCESSING DEVICE

FIELD

The invention concerns a processing device for processing work pieces, which are preferably made at least in part of wood, wooden material, plastics or the like, according to the introductory portion of claim 1.

BACKGROUND

Processing devices of the above-mentioned type are widely used in the furniture and building component industry as well as other industrial branches when processing and manufacturing work pieces. For example, these machines can be used for machining, coating, edge gluing or various other finishing processes. The processing units of these machines are usually built upon a machine bed, which traditionally is made of steel or sheet steel.

The increasing processing speeds and the dynamic load of the processing machines associated therewith bring about that the oscillation characteristics of the machine bed supporting the components of the machine continuously gain in importance. Against this background it has been proposed to manufacture the machine bed from mineral casting (also known as polymer concrete) that is a mixture of a synthetic binder and additives (see for example DE 10 2005 736 A1).

However, it turned out that such mineral casting has a high tensile and burst strength, but is laborious and comparatively expensive to produce.

SUMMARY

It is, therefore, an object of the present invention to provide a processing device of the generic type, the machine bed of which is adapted for dynamic loads and, at the same time, is easy and cheap to produce.

According to the invention, this object is achieved by a processing device for processing workpieces that may be made at least partially of wood, wooden materials, plastics or the like. The processing device may include a machine bed and at least one processing unit connected to the machine bed. The machine bed may include a base body made at least in sections from a curable compound. The base body and/or at least a part of the processing unit may be made at least in sections of cementitious concrete, in particular fibre concrete.

The invention is based upon the notion to resort to materials that are completely novel in the field of mechanical engineering. Against this background the invention provides that in the processing device of the generic type the base body and/or at least a part of the processing unit (or alternatively other suitable components of the processing device) consist at least in sections (partially) of cementitious concrete, in particular fibre concrete. The inventors have, therefore, recognized that the desired dynamic properties of the processing machine can surprisingly be achieved also with this material hitherto used only in the construction sector. In this way, for the first time in the field of processing machines a material can be applied that is easily and economically available and can, moreover, be processed with little effort. Moreover, the concrete has a high durability.

In the framework of the present invention, concrete is to be understood as a cementitious concrete manufactured according to DIN 1045, for example. This can be normal-strength, high-strength or even ultrahigh-strength concrete having a burst strength of 200 MPa or more. In these cases the concrete will comprise several partly synthetic additives, wherein mainly cement continues to be used as binder. Further, within the framework of the present invention the concrete may be provided, if necessary, with un-tensioned or pre-tensioned reinforcement elements that may, for example, consist of steel, but also of other materials such as fiber composites or the like.

According to the invention, the base body of the processing device on the one hand, but also at least a part of the processing unit of the processing device, on the other hand, may be made of concrete. In both cases the appeal of the concrete is its high rigidity (stiffness) and its high self-weight so that it is eminently suitable to serve as base and guide for movable machine parts. For example, the base body of the processing device can thus serve as guide for a dynamically moved arm or a dynamically moved portal. Alternatively or additionally an arm or a portal as partial processing unit may, for example, serve to guide one or more mandrel units or other processing aggregates for their dynamic movement. Thanks to the manufacture of the components from concrete, both cases result in little deformation so that very high dynamics or very precise processing is made possible.

According to a further embodiment of the invention, it is envisioned that the base body and/or at least a part of the processing unit consist at least partly of fiber concrete. In the framework of the present invention, fiber concrete is to be understood as cementitious concrete to which a plurality of fibers has been admixed during manufacture, which can consist of a wide variety of materials and which may comprise a wide variety of materials (for instance steel, plastics, fiber composites etc.) and lengths (for example several millimeters up to several centimeters). The manufacture of the fiber concrete may, for example, be effected according to the construction standard DIN 1045. In this way, the strength of the concrete, on the one hand, may be increased and its crack susceptibility may be lowered so that both the static and dynamic properties and the durability can be improved. Moreover, it becomes possible to reduce the necessity of additional un-tensioned or pre-tensioned reinforcement elements or to renounce such structural (load-bearing) reinforcement elements completely. Thereby not only the manufacture of the concrete components is drastically simplified, but also completely novel geometric shapes of the respective concrete components are made possible.

According to an embodiment of the invention it is further envisioned that the base body is formed in several parts such that it has a base portion substantially comprising cementitious concrete, and at least one connection portion (adapter portion) subsequently joined thereto. Thereby the base body is easy to produce because no complicated single body having a correspondingly complicated formwork (shuttering) has to be produced. Rather, it becomes possible to prepare single parts having a comparatively simple geometry and to subsequently assemble them to a complex body.

Here, the individual components may be prefabricated as in a modular system and may then be assembled to give a desired base body according to the particular requirements. Thus, simplified planning and high flexibility of the production process result, wherein the production may be performed with simple means, in particular, simple formworks having a constant geometry.

Moreover, a configuration of the base body in several parts makes it possible to minimize or to take account of time-dependent deformations of the concrete (for instance due to shrinkage), for example by initially storing the individual parts for a certain time and precisely joining them to each other only after a large proportion of the time-dependent deformations have terminated.

Within the framework of the present invention, the at least one connection portion of the base body may be made of a variety of materials, wherein, having regard to the above-mentioned advantages, it has turned out to be purposeful that at least one connection portion is formed by a concrete component. According to a preferred embodiment of the invention, it is alternatively or additionally envisioned that at least one connection portion is formed by a metal element such as a metal profile. Hereby the connection portion may be provided with a still higher dimensional precision and strength without requiring a special post-processing. Against this background, it is particularly preferred that at least one metal element is configured as guide element or guide profile so as to guide a translatable arm or other mobile parts of the device, for example. Further, the provision of a connection portion made of steel allows possible time-dependent deformations of the concrete (for instance due to shrinkage) to be eliminated at least locally if this is necessary to achieve a high dimensional or positional precision, for example.

Within the framework of this concept of a multi-part base body, a further embodiment of the invention provides that the parts of the base body are glued and/or teethed (geared) together (that is, they are joined together with positive locking in at least one direction). Thus, not only a significantly simplified production and a high stability of the multipart base body result, but by providing a glue joint it is possible to achieve a compensation of the dimensional tolerances, which may occur in concrete components.

According to a further embodiment of the invention it is additionally envisioned that the base body has at least one, preferably at least two connection portions such that the base body has a cross section which is chosen to be L-shaped, U-shaped or triangular, for example.

A configuration of the base body with at least one bracket-like connection portion makes it possible that the base body has a simple construction but is utilizable in many ways. Thus, in a first rotational position (for example connecting portion or arm up), the base body may advantageously be used for console machines, and in another rotational position (for example connecting portion or arm down), may advantageously be used for desktop machines. This is particularly true if the base body has a U-shaped or triangular cross-section, because in this case the number of necessary add-on components is reduced and the rigidity of the base body is increased.

Moreover, according to a further embodiment of the invention, it is envisioned that the base body has at least one steel profile. Such a steel profile may fulfil multiple functions within the framework of the invention by being able to serve as guide, support surface, load transmission region and flexural tension element for the respective base body. Herein it is particularly preferred that the steel profile is set in concrete in order to ensure a non-slip and permanent load transmission between steel profile and concrete of the base body.

Moreover, according to a further embodiment of the invention it is envisioned that the processing unit has a beam-like guide means, in particular an arm or a portal, which is made at least in sections (partially) of concrete, as has already been explained above. Herein it is particularly preferred that the guide means comprises at least one steel profile which may be set into the concrete, for example. The provision of the steel profile may contribute to optimise the strength of the guide means and, moreover, create improved loading points, because the steel profile offers enhanced possibilities for screwing, welding or otherwise attaching aggregates or the like thereon. Further, the steel profile contributes to minimise time-dependent deformations of the concrete and provide a guide means having a high dimensional precision.

The present disclosure provides a method for producing a base body. It is characterised in that the base body is produced by a base portion of concrete, in particular fibre concrete, and a separate connecting portion. Herein, the connecting portion is aligned in a reference position with respect to the base portion and is joined, in particular glued to the base portion. Thereby, the above described advantages of a modular system can be achieved in a particularly simple way, wherein in the case of gluing the glued joint advantageously allows tolerance compensation.

According to a further embodiment of the inventive method it is envisioned that the at least one connecting portion is aligned by means of an alignment station and is kept ready for joining with the base portion. Thereby, it is possible to achieve a particularly high dimensional precision of the finished base body, wherein the alignment station is particularly advantageous for gluing the single components together by providing sufficient time for the glue to cure.

Moreover, according to a further embodiment it is envisioned that the base portion is moved towards the at least one aligned connecting portion upon joining. This enables a particularly precise alignment of the respective connecting portion and a simple and error-free preparation (for example glue application) of the connecting portion.

DRAWINGS

Figure 2:
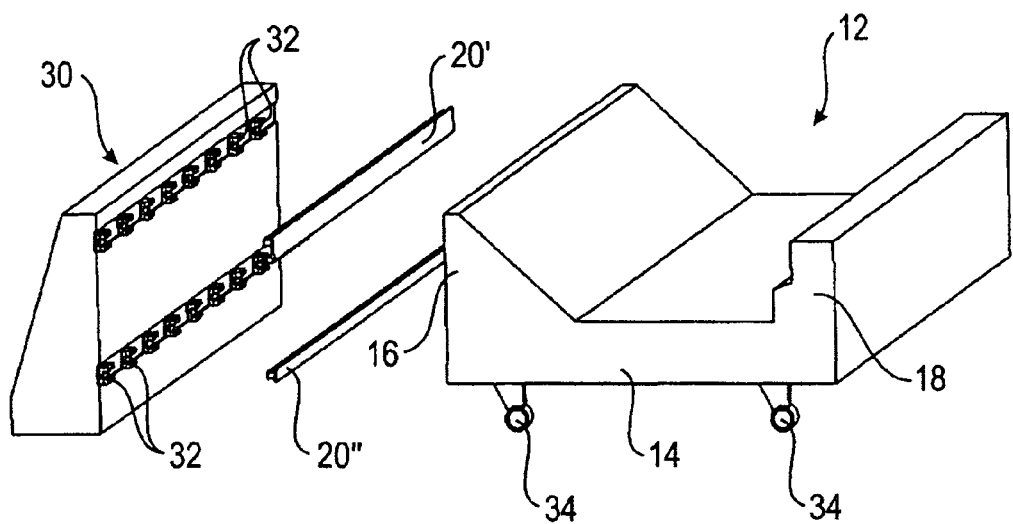
Figure 3:
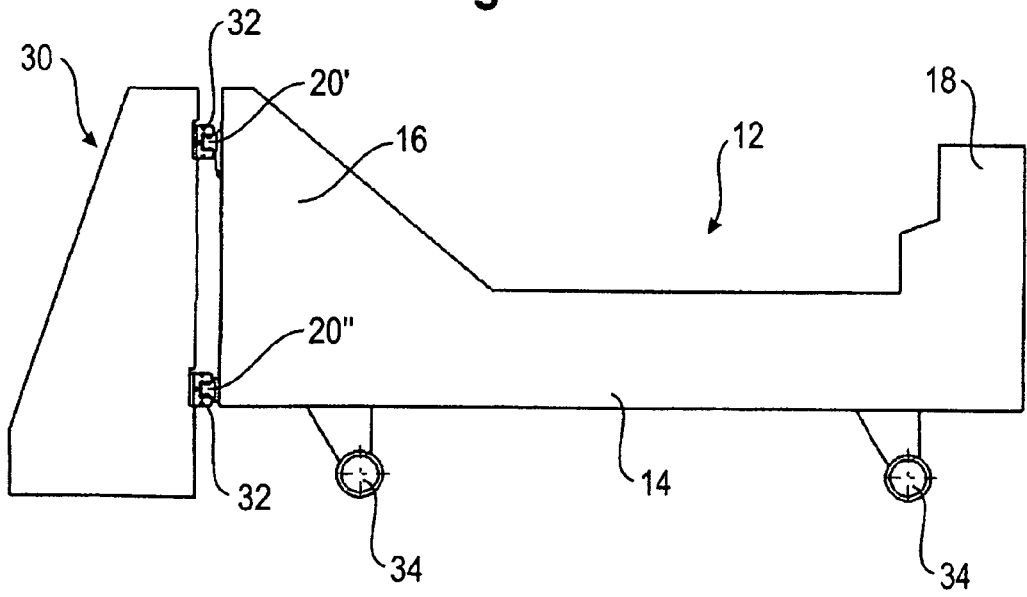
Figure 4:
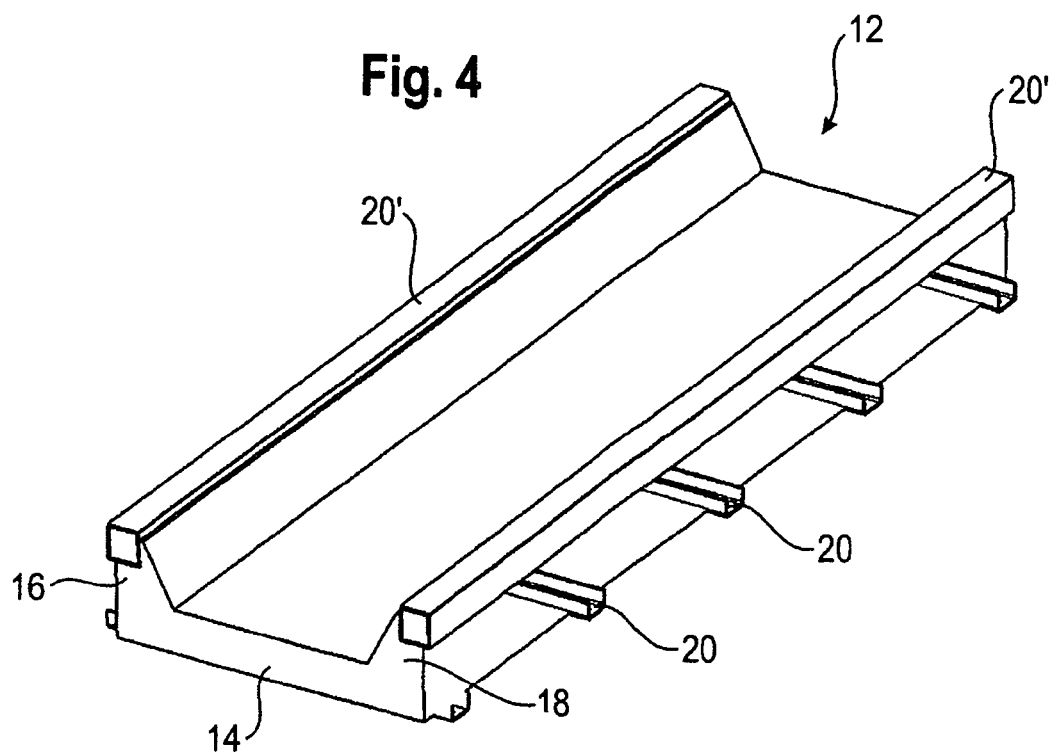
Figure 5:
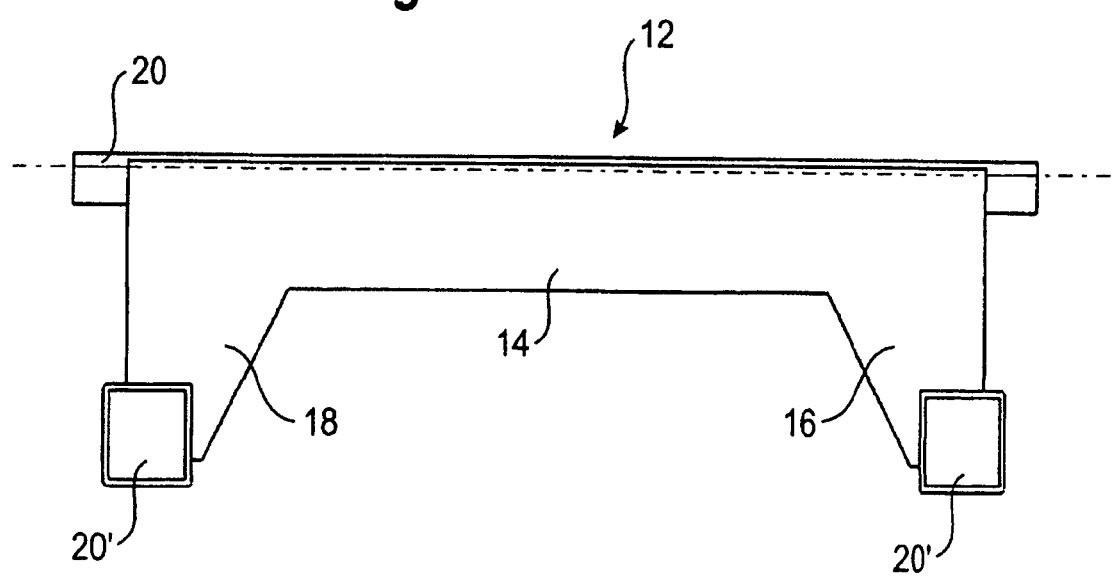

FIG. 1 schematically shows a perspective view of a processing device according to a first embodiment of the present invention;

FIG. 2 schematically illustrates a method of the invention for producing the processing device shown in FIG. 1;

FIG. 3 schematically illustrates the method of FIG. 2 for producing the processing device shown in FIG. 1;

FIG. 4 schematically shows a perspective view of a processing device according to a second embodiment of the present invention;

FIG. 5 schematically shows a perspective view of the processing devices shown in FIG. 4.

DETAILED DESCRIPTION

In the following, preferred embodiments of the present invention will be described in detail by reference to the accompanying drawings.

A processing device 1 as preferred embodiment of the present invention is schematically illustrated in the perspective view of FIG. 1. The shown processing device 1 is, in the present embodiment, a CNC machining centre, although the present invention is not restricted thereto and various stationary or throughfeed machines may be configured according to the invention as well.

In the present embodiment, the processing device 1 serves for processing workpieces (not shown in FIG. 1) that are, for example, made of wood, wooden materials, plastics or the like, such as those used frequently in the field of the furniture and construction components industries. To this end the processing device 1 comprises a processing unit 4, which in the present embodiment is formed by a travelling column or arm 6 and one or more processing aggregates (not shown) provided thereon. Herein, the arm 6 may for example be made of steel, but also comprise concrete, in particular fibre concrete into which a steel profile may be embedded.

The travelling column 6 is translatable along a machine bed 10 which will be described in more detail in the following.

Several consoles 8 (only one of which is shown in FIG. 1) are arranged on the machine bed in order to support and hold the workpieces to be processed (not shown), for example by means of vacuum and/or other jigs (clamping devices). Here, the consoles 8 may be adjustable along the machine bed 10 in a known manner.

The machine bed 10 comprises a base body 12 that is made, in the present embodiment, mainly of concrete, preferably fibre concrete, as defined initially by referring to DIN 1045.

In the present embodiment, the geometry of the base body 12 is substantially U-shaped so that the base many 12 has a planar base portion 14 and two shanks (sides) 16, 18 provided under an angle thereto. The angle between the base portion and the shanks may be varied in many ways so that through a corresponding inclination of the shank 18, for example, also a triangular cross-section or several other cross-sections may be produced.

In the present embodiment, the base body 12 comprises two steel profiles 20 which are set in the concrete of the base body 12. To that end the steel profiles 20 may be provided with suitable anchoring means such as head bolts, loops or the like. Here, as can be seen from FIG. 1, the steel profiles 20 are arranged so that they serve as support surface for the base body 12. Moreover, the steel profiles 20 impart additional stability and crack safety to the base body 12.

Moreover, in the present embodiment, the base body 12 comprises two further steel profiles 20' which are attached to the shanks 16 and 18, respectively, as connecting portions. The steel profiles 20' are arranged in such a way in the region of the free end of the shank 16 or 18 that they can serve as guide for a translational movement of a travelling column 6 or other movable parts. In the present embodiment, these are glued to the shanks 16 and 18, respectively, in order to ensure the necessary precise positioning of the steel profiles 20'.

A preferred embodiment of the method of the invention for producing the above-described base body 12 will be described in the following by referring to FIGS. 2 and 3. First, the base portion 14 with its shank or connecting portions 16 and 18 is manufactured from concrete, in particular fibre concrete. Further, the steel profile 20' and a further steel profile 20" that may serve as additional guide, for instance, are prepared and aligned in a reference position by means of an alignment station 30. To that end, the alignment station 30 comprises a plurality of gripping elements 32, by means of which the steel profiles 20', 20" can releasably be kept ready in a reference position. Here, the reference position refers for example to the desired position and the desired travel of the travelling column 4.

Subsequently, a suitable glue is applied to the steel profiles 20', 20" on the side facing the base portion 14 in order to move now the base portion 14 with shanks 16, 18 towards the steel profiles 20', 20" (for example by means of rollers 34 shown in FIGS. 2 and 3) and to press it thereon. Thus, the steel profiles 20', 20" are joined securely and in a precisely defined position to the concrete parts 14, 16, 18.

As soon as the glue is cured, the steel profiles 20', 20" can be disengaged from the alignment station 30 so that the alignment station 30 is now ready for the next gluing operation.

Although not shown in the figures, other bonding means in addition to the glue joint may also be employed, such as screws, bolts or the like.

Although also not shown in FIGS. 1 to 3, the base body 12 may also be formed from several parts, for instance by joining shanks 16 and/or 18 subsequently to the base portion 14. In this case, in order to produce the base body 12, the individual base body portions 14, 16 and 18 are at first prepared in the respective formworks, with the formworks preferably being reusable formworks having a high-strength formwork facing made, for instance, of steel or the like. Here, like in the embodiment shown in FIG. 1, the steel profiles 20 may already be set into the base portion 14, although they may also be subsequently attached, in particular glued, to the respective components.

Then, the joining surfaces are prepared for the subsequent joining operation and are provided with a glue layer in order to join now the components 14, 16 and 18 to each other. For a precise and secure connection of the individual components an alignment station may also be employed, as was described above by reference to FIGS. 2 and 3. The individual components may thus be held in a desired reference position, with the glue layer then providing tolerance compensation. In this way, a base body having highly precise dimensions may be produced, which otherwise can be realised only by means of structural steel work.

Then, the components 14, 16 and 18 may additionally be screwed together or non-positively joined in another way, although this is not absolutely necessary. In the opposite case it is to be observed that instead of gluing the single components 14, 16, 18 together, other joining techniques may be employed as well, such as mere screwing and/or another non-positive or positive joining of the components, etc.

Although also not shown in the figures, the base body 12 according to the invention may also be arranged standing "head down" so as to result in a desktop machine. The base body 12 according to the invention may thus be employed variously and flexibly so that a great variety of machines may be produced with a single formwork or a single set of formworks.

Further, within the framework of the present embodiment it is also possible to set up the base body 12 in a different alignment, for instance with the base portion 14 pointing down and the shanks 22 being aligned vertically. In this case, a suitable guide for a travelling column or also for any other type of machine construction may be attached at the free end of the shanks 22. Further, it may be expedient to design the base portion 14 also in this embodiment to be at least partially hollow or to have dimensions so as to achieve an optimum ratio between weight, rigidity and oscillation behavior.

The machine bed that is made at least partially from concrete may also be a machine bed extended subsequently by concrete (for instance by gluing, screwing etc).

The second preferred embodiment of the processing device according to the invention is schematically shown in a perspective view in FIGS. 4 and 5, wherein these figures centre on the configuration of the base body 12. The base body 12 shown in FIGS. 4 and 5 is characterised in that it is made "in one pour". Not only are the base portion 14 and the shanks 16, 18 made integrally of concrete or fibre concrete, but also the steel profiles 20, 20' are directly set in concrete in the base portion 14 or the shanks 16, 18. To that end the steel profiles 20 are formed as U-profiles having anchoring means such as a head bolts (not shown) or the like so as to achieve a direct bond. In contrast, the profiles (connecting portions) 20' are formed as rectangular box-section slabs. In order to allow the concrete to enter the interior of the box-section slab and to bond correspondingly with the concrete, the steel profiles 20' of the present embodiment are provided with radial through-holes (not shown). Here, FIG. 5 shows the base body 12 in the position it takes when the concrete is poured into the formwork. FIG. 4, in contrast, shows the possible position of the base body 12 as a machine bed. It is to be observed, however, that the base body 12 may also be used as a machine bed in the position shown in FIG. 5, with this position being adapted primarily for so-called desktop machines.

For all embodiments it is to be observed that the base body 12 may also be provided with a variety of through-holes, conduits, anchoring points etc. in order to further optimise the functionality of the base body 12, for instance with respect to weight, rigidity, material usage, routing of data, compressed air or other conduits, attaching of machine parts, etc.

What is claimed is:

1. A method for producing a base body of a processing device comprising the steps of:
    producing a base portion of cementitious fibre concrete,
    preparing at least one connecting portion to be joined to the base portion,
    providing an alignment station;
    supporting the connecting portion with the alignment station;
    aligning the at least one connecting portion with the base portion in a reference position,
    gluing the at least one connecting portion to the base portion, and
    integrating a steel profile into the base portion such that the steel profile extends into and beneath the base portion, the steel profile providing a standing surface for the base portion.

2. The method of claim 1, wherein the at least one connecting portion is aligned by means of the alignment station and is kept ready for joining to the base portion.

3. The method of claim 1 wherein the base portion is moved towards the at least one aligned connecting portion upon joining.

4. The method of claim 1, wherein the cementitious fibre concrete has a burst/compression strength of 200 MPa.

5. The method of claim 1, wherein the alignment station includes a plurality of gripping members configured to releasably support the guide element.

6. A processing device for processing workpieces that are preferably made at least partially of wood, wooden materials, plastics or the like, comprising:
    a machine bed, at least one processing unit connected to the machine bed, and an alignment station, wherein the machine bed comprises a base body made at least in sections from a cementitious fibre concrete,
    wherein the base body and/or at least a part of the processing unit is made at least in sections of cementitious fibre concrete and the base body includes a cementitious fibre concrete base portion, at least one cementitious fibre concrete connecting portion glued to the base portion, and at least one pre-tensioned steel profile,
    wherein the at least one steel profile is integrated into a base portion of the base body;
    wherein a guide element is supported by a first of the least one connecting portion; and
    wherein the alignment station is configured to support the guide element to align the at least one connecting portion with the base portion.

7. The processing device of claim 6, wherein the base body is configured in several parts so that it comprises the base portion including cementitious concrete, in particular fibre concrete, and the at least one connecting portion subsequently joined thereto.

8. The processing device of claim 7, wherein the guide element is formed from metal.

9. The processing device of claim 7, wherein parts of the base body are glued and/or teethed together.

10. The processing device of claim 7, wherein the base body comprises the at least one connecting portion so that the base body has a cross-section chosen from L-shaped, U-shaped or triangular.

11. The processing device of claim 6, wherein the processing unit comprises a beam-like guide means, in particular an arm or a portal made at least in sections of concrete and comprising at least one steel profile.

12. The processing device of claim 6 wherein said at least one pre-tensioned steel profile is set in concrete.

13. The processing device of claim 6, wherein the cementitious fibre concrete has a burst/compression strength of 200 MPa.

14. The processing device of claim 6, wherein the guide element is configured for translational movement of the at least one processing unit.

15. The processing device of claim 6, wherein the alignment station includes a plurality of gripping members configured to releasably support the guide element.

* * * * *